United States Patent Office 3,541,071
Patented Nov. 17, 1970

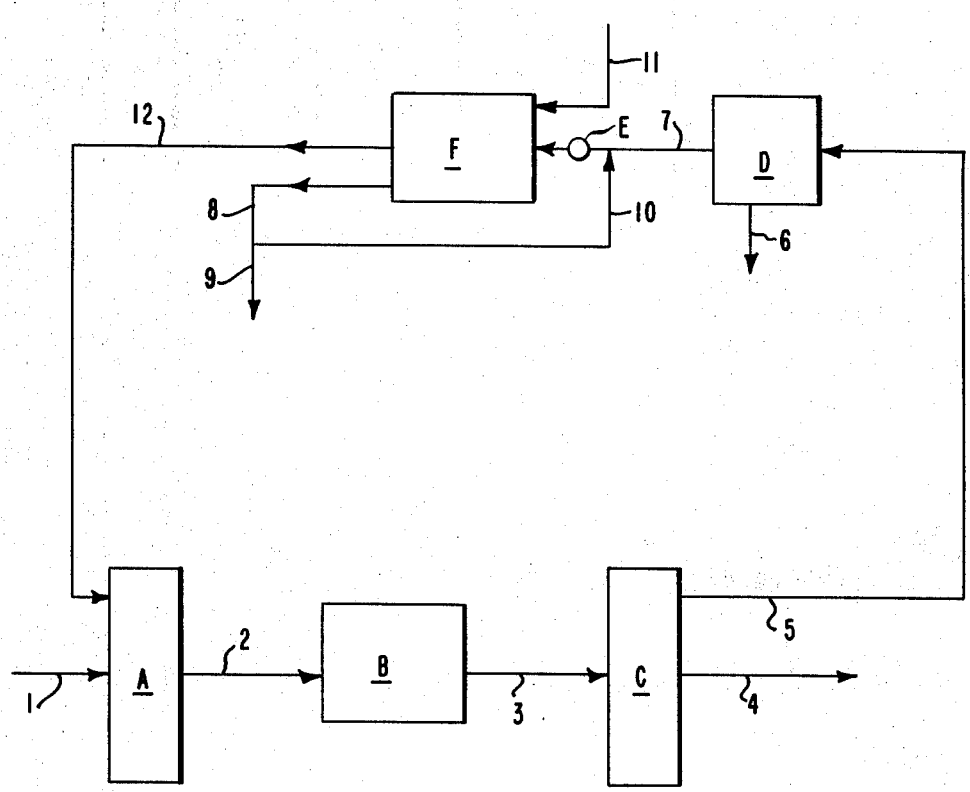

3,541,071
METHOD FOR REMOVING AMMONIA AND WATER FROM UNPOLYMERIZED CHLOROPRENE STRIPPED FROM NEOPRENE LATEX
Edward Joseph Doll, Montague, Mich., assignor to E. I. du Pont de Nemours and Company, Wilmington, Del., a corporation of Delaware
Filed Dec. 15, 1967, Ser. No. 690,937
Int. Cl. C08d 3/14; C08f 3/32, 3/20
U.S. Cl. 260—92.3                                  4 Claims

ABSTRACT OF THE DISCLOSURE

A process for removing ammonia and water from recovered unpolymerized chloroprene stripped from neoprene latex wherein HCl is utilized to form $NH_4Cl$ and the amount of water controlled to maintain desired acidity and enhance the separation of said chloroprene from water containing ammonium chloride.

BACKGROUND OF THE INVENTION

It is known that chloroprene may be polymerized in aqueous dispersions and the resulting polymer readily isolated by routine drying procedures; such processes, for example, are described in U.S. Pat. 2,914,497. It is customary in such an aqueous dispersion process to carry out said polymerization by emulsifying the monomer solution, under nitrogen, in water containing ammonia. A catalyst solution is utilized to maintain a given rate of polymerization; when the desired degree of polymerization is achieved, it is stopped by adding, for example, thiodiphenylamine and p-tertiarybutyl catechol, dissolved in toluene and emulsified in a water solution of a dimethylamine salt of a disproportionated rosin as disclosed in U.S. Pat. 2,914,497. Unpolymerized chloroprene monomer is then removed, along with the ammonia, by mixing with steam and passing the resulting mixture of liquid and vapor through a glass tube under conditions of turbannular flow into a receiver in which the ammonia, vaporized chloroprene, and excess steam are separated from the polychloroprene dispersion (latex). U.S. Pat. 2,467,769 discloses a procedure and apparatus which may be utilized to achieve this separation.

If the unpolymerized recovered chloroprene, water and excess ammonia are returned to the chloroprene refining column, there is a serious problem of $NH_4Cl$ deposition in said refining column as it is maintained under acidic conditions. When operating the process continuously, the ammonia precipitates as $NH_4Cl$ and gradually plugs the chloroprene refining column, in addition to causing equipment corrosion and reducing the efficiency of the purification of chloroprene.

DESCRIPTION OF THE INVENTION

The chloroprene monomer utilized is the process of the present invention should preferably contain no more than traces of impurities prior to polymerization. The presence of inorganic impurities should be substantially avoided as should organic impurities such as monovinylacetylene, divinylacetylene, acetaldehyde, methylvinylketone, etc. to minimize processing problems, undesirable properties, and/or the production of objectionable odor and color in the resulting isolated chloroprene polymer.

The present invention is directed to a process, continuous or batch, for substantially and rapidly separating ammonia and water from chloroprene stripped (recovered) from neoprene latex; this separation is achieved by acidifying said chloroprene ammonia and water with gaseous or dilute aqueous HCl. This separation is significantly enhanced by the resulting greater specific gravity difference between the organic and aqueous phases which form due to the persence of HCl and ammonium chloride in the aqueous phase. The higher water phase specific gravity reflects low ammonium chloride concentrations in the recovered chloroprene that is finally recycled to the chloroprene refining column.

Reference is now made to the accompanying drawing flow sheet which illustrates the present invention.

The fresh chloroprene monomer of stream 1 and the substantially dry and slightly acidic recovered chloroprene monomer of stream 12 are introduced into packed refining column A wherein acidity is substantially controlled by maintaining HCl content of stream 12 within the range of about 1 to 50 p.p.m. HCl by weight and water substantially excluded. In this chloroprene refining column A, high boiling impurities and trace amounts of polymer are removed. Any packed distillation column designed to remove impurities boiling above the feed material being purified may be utilized. The resulting refined chloroprene is passed as stream 2 to enclosed polymerization vessel B having heat removal means wherein it is agitated and mixed with three parts purified disproportionated wood rosin ("Resin 731-S" sold by Hercules Powder Company) and 0.25 part dodecyl mercaptan per 100 parts by weight chloroprene. The resulting solution is then (1) emulsified in 118 parts of water containing 1.35 parts ammonia (100 percent basis), 0.035 part KOH, 0.15 part potassium sulfite and 0.1 part of the sodium salt of sulfonated dinaphthylmethane; this emulsification is effected under nitrogen with an Eppenbach homomixer, and (2) polymerized under nitrogen with gentle agitation in a glass vessel surrounded by a bath by which the temperature of the emulsion is kept at 40° C.; a catalyst solution containing 1.5 percent of ammonium persulfate and 0.15% of the sodium salt of anthraquinone $\beta$-sulfonic acid is then added to maintain a constant rate of polymerization. At from about 60 to 90 percent chloroprene conversion, further polymerization is stopped by adding 0.007 part of thiodiphenylamine and 0.0014 part of p-tertiarybutyl catechol, dissolved in toluene and emulsified in a water solution of the dimethylamine salt of disporportionated rosin. The unpolymerized chloroprene (10 to 40 percent) water and ammonia are removed from latex stream 3, in chloroprene monomer recovery system C, by mixing with stream at 150 mm. pressure (60° C.) and passing the resulting mixture of liquid and vapor through a glass tube under conditions of turbannular flow into a receiver in which the $NH_3$, vaporized chloroprene monomer and excess steam are separated from the polychloroprene dispersion (latex) and then condensed to become the recovered chloroprene of stream 5, which also contains 1 to 20 weight percent separate water phase and separate phase ammonical wtaer containing 0.5 to 5 percent $NH_3$. Stream 4 from recovery system C passes the resulting polychloroprene latex on for isolation or finishing, all according to the procedure of U.S. Pat. 2,914,497.

The invention process is applicable to aqueous chloroprene polymerization systems including the use of an ammonium rosinate in the system recipe.

Stream 5 is fed from C into gross water removal hold tank D at 0 to 10° C. and held in said tank D at 0 to 10° C. Most of the water of stream 5 is drawn off as stream 6 prior to feeding, as stream 7, the remaining recovered chloroprene to the recirculating aqueous acidification system pump E and then to separation tank F. The recovered chloroprene stream 7 contains about 325 p.p.m. (0.0325%) ammonia and a small amount of separate phase water (less than 2 percent water). This stream 7 is monitored for $NH_3$ content by sampling stream 7, extracting the $NH_3$ with distilled water and then using the Kjeldahl Method to determine percent $NH_3$ present. The separate phase water of stream 7 is measured volumetrically and monitored visually by observing the organic and aqueous phases and contacted with recirculating acid water 10 in mixing pump E; this recirculating acid water contains about 2.5 percent HCl and about 13.5 percent $NH_4Cl$. The recirculating acid water 10 may contain wider ranges of HCl and $NH_4Cl$; for example, HCl concentrations of about 0.5 to about 15% and $NH_4Cl$ concentrations of from 0 to about 25 percent can be effectively handled. HCl gas or concentrated aqueous HCl (about 30% HCl) is added by stream 11 to the mixture of chloroprene water and ammonia in separation tank F to react with the ammonia to form and concentrate $NH_4Cl$ in the aqueous phase and to maintain the acidity of stream 10. The HCl and $NH_4Cl$ content of stream 10 is periodically analyzed to maintain an acidity of about 2.5% HCl and control the $NH_4Cl$ build-up to about 13.5% in stream 10. The percent HCl present is determined by titration with standard NaOH and the amount of $NH_4Cl$ is determined by the Kjeldahl Method. Concentrated aqueous HCl (30 percent) is added via stream 11 as needed to maintain the desired acidity and to react with the $NH_3$ of stream 7 to form $NH_4Cl$ in tank F. The $NH_4Cl$ build-up and percent HCl present is further controlled by periodic ditching of the aqueous phase from tank F via streams 8 and 9. The $NH_4Cl$ formed builds up in the aqueous solution in tank F to an equilibrium level which depends on the amount of water added by streams 7 and 11, the amount of ammonia in stream 7 and is the amount of $NH_4Cl$ in stream 10.

The aqueous phase from separation tank F is removed as stream 8 and is periodically removed by stream 9 to maintain the aqueous layer in separation tank F at a constant volume of about 25 percent of the capacity of said tank F. The hold up time in tank F depends on its size; the separation takes place rapidly and is done at about 0° C. to reduce the solubility of water in the organic phase while remaining just above the freezing point of the aqueous phase; the hold up time is a practical consideration; for example, a hold up time of about ten minutes or more is sufficient.

The resulting chloroprene stream 12 from separation tank F is substantially dry and slightly acidic; it is fed to chloroprene refining column A, along with fresh chloroprene 1, to blend with 1 and to remove trace amounts of polymer. The recovered chloroprene of substantially dry and slightly acidic stream 12 contained about 15 p.p.m. $NH_4Cl$ and approximately 0.09 percent water. It is preferred that less than 50 p.p.m. $NH_4Cl$ and less than 0.15 percent water be present in the recovered chloroprene monomer recycled to refining column A.

The $NH_4Cl$ content of stream 12 is monitored by the Kjeldahl Method; the water content by use of a Karl-Fischer aquameter and the HCl content by periodically diluting a sample of stream 12 with neutralized methyl alcohol followed by titration with standard NaOH. The percentage of HCl present in stream 12 is controlled in tank F by adjusting the percentage of HCl present in acid-water stream 10 containing $NH_4Cl$; this control is achieved by varying the feed rate of HCl addition via stream 11.

The present process significantly controls the acidity in the chloroprene monomer refining column and prevents uncontrolled deposition of solid $NH_4Cl$ on the packing of said column. Acidity control is maintained by controlling the percentage of water in the recovered chloroprene monomer recycle stream 12 so that said percentage of water is held to not more than 0.3%. In controlling the percentage water present in stream 12 to less than 0.3 percent, the amount of HCl present in stream 12 is substantially controlled to result in the desired acidity of about 1 to 50 p.p.m. by weight HCl being maintained in stream 12.

The amount of $NH_4Cl$ in the substantially dry, slightly acidic recovered and recycled chloroprene monomer stream 12 should be held to a practical concentration, preferably under 50 p.p.m. More than 100 p.p.m. $NH_4Cl$ can be handled with an increased frequency of chloroprene refining column pluggage; in the practice of the invention process, the frequency can be significantly reduced.

Concentrated aqueous HCl, about 30 percent HCl, is added as needed to the water phase in F to maintain an acidity of about 2.5 percent HCl in recirculating acid water stream 10. Sufficient acid is maintained to neutralize the $NH_3$ in the ammonical water of stream 7 and the $NH_4Cl$ content controlled to maintain the higher water phase specific gravity in tank F. Recirculation acid water stream 10 is routinely analyzed for HCl and $NH_4Cl$ content and concentrated aqueous HCl added by stream 11 as necessary to maintain the acidity of stream 10 and neutralize $NH_3$. Stream 12 is also routinely analyzed for water, HCl and $NH_4Cl$ content. The recovered chloroprene of stream 12 averaged, by weight, from 0 to 30 p.p.m. $NH_4Cl$, about 20 p.p.m. HCl and approximately 0.09 percent water; there was no separate water phase but stream 12 was cloudy.

As many apparently widely different embodiments of this invention may be made without departing from the spirit and scope thereof, it is to be understood that this invention is not limited to the specific embodiments thereof except as defined in the appended claims. All changes which come within the meaning and range of equivalence are intended to be embraced by the appended claims.

The embodiments of the invention in which an exclusive property or privilege is claimed are as follows:

1. The process of substantially removing ammonia and water from a chloroprene monomer mixture containing, by weight, about 1 to 20% water and 0.5 to 5% $NH_3$ and recovered by vaporization and condensation from a polychloroprene latex obtained by polymerizing chloroprene in an aqueous ammoniacal medium to from 60 to 90% conversion, which process comprises (1) separating the bulk of said amonia and water from said chloroprene mixture by holding the mixture at 0 to 10° C. until a predominantly chloroprene phase, containing less then 2% by weight of water and about 0.0325% by weight of $NH_3$, and a predominantly water phase containing $NH_3$ have formed, and drawing off the predominantly water phase; followed by (2) contacting said predominantly chloroprene phase containing the remaining ammonia and water with an aqueous solution containing, by weight about 13.5% NH4Cl and about 2.5% HCl to neutralize said ammonia and concentrate said $NH_4Cl$, whereby to produce (a) an organic phase containing chloroprene, 1 to 50 p.p.m. by weight of HCl, up to 0.3% by weight water, and up to 100 ppm. by weight ammonium chloride, and (b) an aqueous phase containing HCl and concentrated ammonium chloride; and (3) separating said organic phase from said aqueous phase at about 0° C.

2. The process of claim 1 wherein said aqueous phase from step (3) is recirculated and mixed with said recovered chloroprene containing the remaining ammonia and water prior to said step (2).

3. The process of claim 1 followed by feeding said organic phase from step (3) and fresh chloroprene monomer to a refining column to remove high boiling impurities and trace amounts of polymer and produce refined chloroprene monomer.

4. The process of claim 3 followed by (1) aqueous polymerization of said refined chloroprene monomer, in the presence of an ammonium rosinate, to form polychloroprene latex, (2) srtipping of unploymerized chloroprene monomer from said polychloroprene latex and (3) recovery of said unpolymerized chloroprene monomer.

References Cited

UNITED STATES PATENTS 2,467,769   4/1949   Morrow et al.
2,914,497   11/1959   Keller _____ 260—92.3 XR JOSEPH L. SCHOFER, Primary Examiner W. F. HAMROCK, Assistant Examiner U.S. Cl. X.R.

260—29.7, 76